United States Patent Office 3,031,242
Patented Apr. 24, 1962

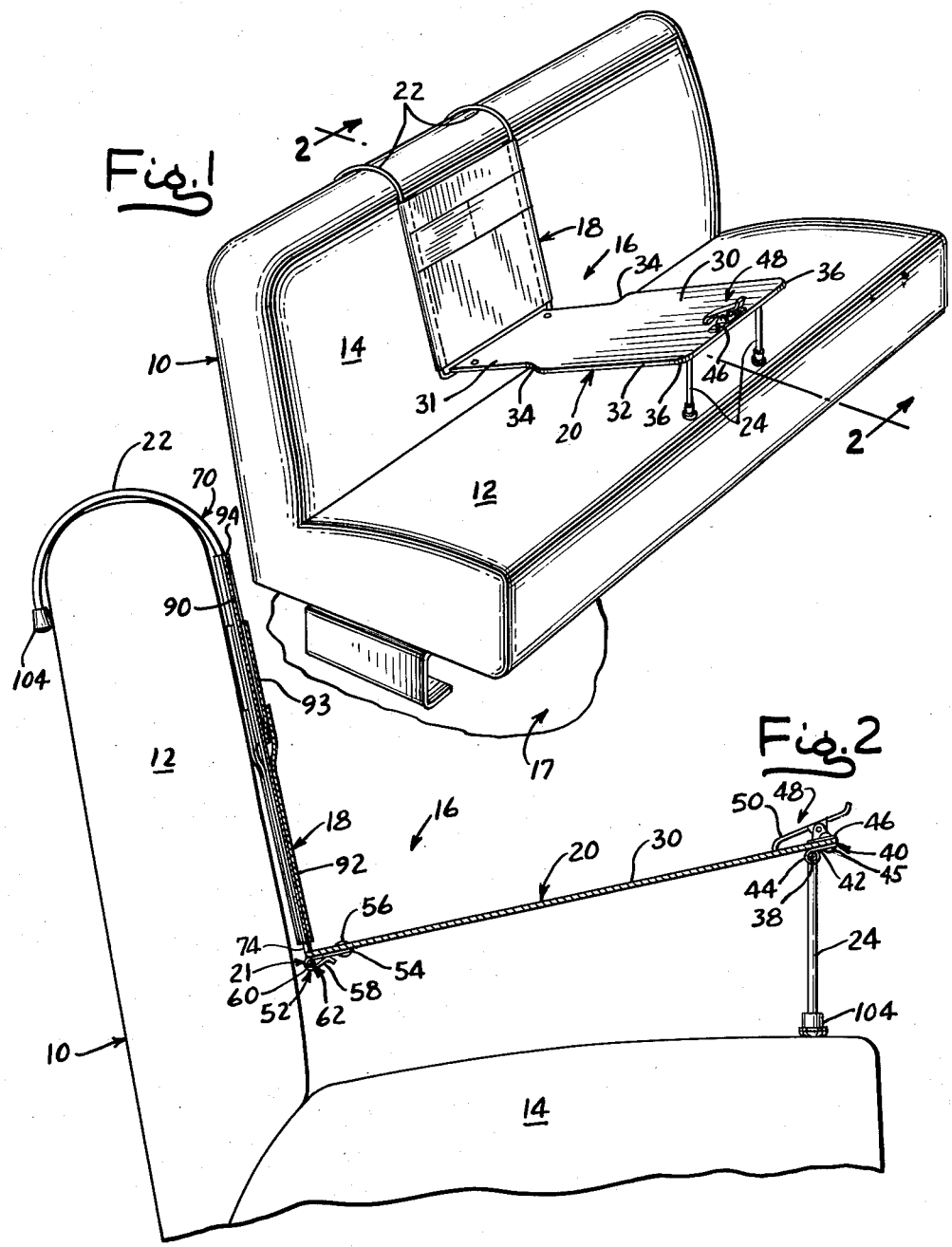

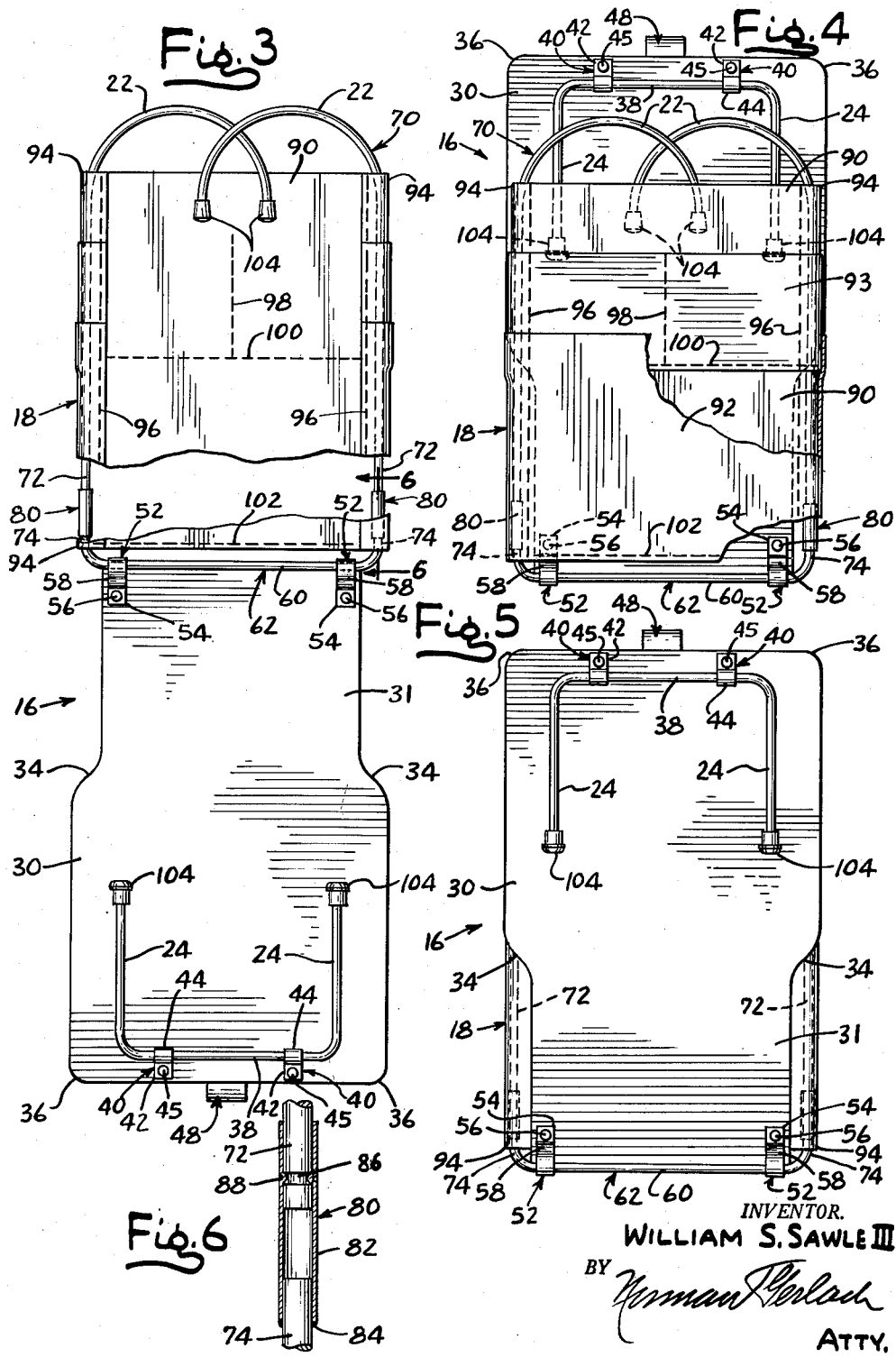

3,031,242
PORTABLE FOLDING AUTOMOBILE DESK
William S. Sawle III, 1334 Woodland, Deerfield, Ill.
Filed Feb. 8, 1961, Ser. No. 87,891
2 Claims. (Cl. 311—21)

The improved portable folding desk comprising the present invention has been designed for use primarily by salesmen to whom it offers a convenient means for keeping note pads, sales literature, such as brochures and the like, price lists, itinerary schedules, order blanks and other sales miscellany close at hand, while at the same time, affording a convenient and firm writing surface which, when the device is operatively installed in position within the automobile interior, assumes a position within the correct visual range of the salesman. The device further affords a convenient storage space for pens, pencils, rulers and the like, such items being maintained in an out-of-the-way position yet partially visible for proper selection thereof, and it also affords a storage space for concealing flat papers and keeping them flat and in a clean condition. During warm weather when the automobile windows are apt to be open, the device, although extended for use, is capable of maintaining any exposed flat paper work in operative position on the table-supporting surface associated with the device so that it will not be blown away or otherwise disturbed by drafts.

The invention is by no means limited to use by salesmen, and automobile desks constructed in accordance with the invention may be found useful by individuals other than salesmen, for example, housewives who may have occasion to prepare or check shopping lists while in the automobile, by tourists who may want to study or mark road maps, and for whom the device may serve the additional function of providing storage space for small articles such as cigarettes, a flashlight, sunglasses, a razor, soap or other cosmetic paraphernalia, or by professional men such as engineers, doctors, students and the like for whom the device will have special use, as will be described presently.

The writing surface of the device may find utility other than for writing purposes and, when the device is operatively installed within an automobile, such surface may provide a support for food containers during refreshment periods, or it may serve the function of a game board.

The device may alternatively be operatively installed in the rear region of the automobile interior for use by the occupants of the rear seat. In such a case, the back part may be supported from the back rest of the front seat in an upright position and the base part may be caused to bridge the distance between the back rest and the seat cushion of the back seat so that the distal or free edge region of the base part rests upon and is supported by the seat cushion.

The invention is capable of uses other than automobile uses and portable folding desk devices construed in accordance with the principles of the present invention may be found useful, without any modification whatsoever, by train and airplane travelers who may operatively install the device on an unoccupied adjacent seat for use. When not in use, the device may be folded and stored in the usual back rest pocket of the forward seat, such pockets invariably being a feature of airplane seat back rests. Irrespectively, of the particular use to which the present invention may be put, the essential features thereof are at all times preserved.

Briefly, the invention contemplates the provision of an automobile desk of the character briefly outlined above which is comprised of two principal parts or assemblies including a back part which, when the device is operatively installed within an automobile interior, is adapted to be supported on the back rest of an automobile seat and to assume an upright position substantially flush with the front face of the back rest, and a base part adapted in the main to be supported on the seat and to assume an approximately horizontal position. The back part affords a convenient storage space for articles, while the base part affords a convenient writing surface.

Each of the two parts is generally flat and the two parts are hingedly connected together for relative swinging movement throughout substantially 360° so that the parts may be folded flat against each other, either in back-to-back relationship or front-to-front relationship, as desired. In either case, the folded device is extremely compact and will consume but small storage space when slid beneath the front automobile seat, for example, or when stored within the luggage compartment. The front face of the back part and the front face of the base part have a generally smooth contour so that when these two faces are folded together in face-to-face relationship, any papers or other generally flat articles will be confined between the two faces and thus maintained in a flat condition as well as being protected against soiling. When folded in the other direction, i.e., in back-to-back relationship, the moving mechanical parts of the device will be confined between the back face of the back part and the back face of the base part so that these mechanical instrumentalities will not present an obstruction when the folded device is inserted into a small confining space, such, for example, as the interior of a brief case or suitcase.

The two parts of the device are readily separable so that either the back part or the base part may be left within the automobile while the other part may be transported for use elsewhere. For example, the base part may be transported separately for writing purposes at a remote location where other writing support is not available, or the back part may be transported for subsequent reference to the stored papers or other materials housed thereby. The manner of folding and of separation of the two parts of the device constitute important features of the present invention.

The provision of an automobile accessory such as has been briefly outlined above constitutes the principal object of the present invention, and it is a further object to provide such an accessory wherein the necessary movements or articulation of the folding framework associated therewith incident to folding thereof, in no way affects the flat condition of the storage compartments so that the user may, at any time, discontinue his paper work, fold the device with the paper work disposed therein, and subsequently, unfold the device and find the paper work undisturbed and in the position which it assumed prior to folding operations.

Yet another object of the invention is to provide an automobile desk of this character which, when it is operatively installed on the front seat of an automobile, will permit the base part to be folded flat against the upright back part to an out-of-the-way position without disturbing the position of any paper work which may be disposed on the base part, while at the same time, concealing the paper work, protecting it against accidental displacement or soiling, and making available for use the seat space formerly occupied by the base part, even to the point of seating a passenger in such space.

A still further object of the invention is to provide an automobile desk in which the base part is comprised largely of a single sheet of material cut from flat fiberboard or similar stock, and in which the back part includes a frame which is formed largely from elongated metal rod stock, and a frame covering which is formed of composite cloth and sheet plastic material. By such an arrangement, due to the availability of such materials for immediate use without the necessity of resorting to expensive shaping, machining, and other forming operations, economy in manufacture results.

The provision of an automobile desk which is extremely simple in its construction, one which is comprised of a minimum number of moving parts and which, therefore, is unlikely to get out of order; one which involves no interengaging threaded parts which ordinarily are likely to become unfastened, one which is of lightweight construction; one which is extremely compact when folded and presents a relatively thin flat "package"; one in which the flexible cloth and plastic portions thereof are readily removable from the framework on which they are mounted for purposes of cleaning, inspection or repair; one which is rugged and durable and which, therefore, will withstand rough usage; and one which is attractive in its appearance and pleasing in its design, are further desirable features which have been borne in mind in the production and development of the present invention.

Other objects and advantages of the invention, not at this time enumerated, will become more readily apparent as the nature of the invention is better understood.

In the accompanying two sheets of drawings forming a part of this specification, one embodiment of the invention has been shown by way of illustration but not by way of limitation.

In these drawings:

FIG. 1 is a perspective view of a completely erected two-part foldable automobile desk constructed in accordance with the principles of the present invention and showing the same operatively installed in the driver's compartment of an automobile vehicle;

FIG. 2 is a sectional view taken substantially centrally and vertically through the erected automobile desk;

FIG. 3 is a plan view of the automobile desk with the two parts thereof extended to coplanar relationship and with the rear sides thereof exposed to view, and with certain parts broken away to more clearly reveal the nature of the invention;

FIG. 4 is a plan view of the automobile desk showing the same in one of the two collapsed or folded conditions of which the same is capable;

FIG. 5 is a plan view similar to FIG. 4 showing the automobile desk in its other collapsed or folded condition; and FIG. 6 is an enlarged sectional view taken substantially along the line 6—6 of FIG. 5.

Referring now to the drawings in detail, and in particular to FIG. 1, an automobile seat has been designated in its entirety at 10, and it includes a seat proper 12 in the form of the usual seat cushion, and a back rest 14 therefor, the seat and back rest serving to support thereon in an operative position the automobile desk 16 of the present invention. The seat assembly 10 is shown as being operatively installed in the passenger compartment of an automobile 17.

The automobile desk 16 is comprised of two principal parts or assemblies, namely, a back part 18 and a base part 20. The two parts 18 and 20 are hingedly connected together as at 21 for swinging movements of the parts relatively to each other in either direction between either of the two folded positions wherein they are shown in FIGS. 4 and 5, respectively. In FIG. 4, the parts 18 and 20 are shown as having been swung relatively to each other from the erected position of the parts throughout an angle of approximately 270° to bring the back faces of the parts together, while in FIG. 5, the parts are shown as having been swung relatively to each other from the erected position of the same throughout an angle of approximately 90° to bring the front faces of the parts together.

In the operative position of the device, as best seen in FIGS. 1 and 2, the front face of the back part 18 faces forwardly while the back face thereof faces rearwardly and is positioned in substantial face-to-face contact with the forwardly facing surface of the back rest 14. The front face of the base part 20 faces upwardly, while the back face thereof faces downwardly in spaced opposition to the upper face of the seat cushion. The back part 18 is supported in position on the back rest 14 solely by means of a pair of pivoted hook members 22 which constitute functional elements of the framework of the back part, as will be described presently. The rear portion of the base part 20 is supported from the lower edge of the back part by virtue of its hinged connection 21 therewith, while the forward region of the base part 20 is supported upon collapsible legs 24, as will also be described subsequently. The legs and hinged connection serve to maintain the base part elevated an appreciable distance above the seat cushion 12 and in a substantially horizontal position.

As best seen in FIGS. 1, 2 and 5, the base part or assembly 20 is comprised of a flat sheet 30 of compressed fiberboard or similar material, having a reduced proximate neck portion 31 and a distal body portion 32 of increased width which merges with the neck portion along inclined edge regions 34. The two corners of the body portion 32 are preferably rounded as at 36. The previously-mentioned legs 24 constitute portions of a U-shaped length of rod stock and they are connected together by a straight bight portion 38 which is held flat against the back side of the sheet 30 of fiberboard by means of attachment clips 40 having flat ears 42 and arcuate strap portions 44, which confine the rod stock against the fiberboard sheet while permitting turning movement of the stock. The legs 24 are thus capable of being swung between the operative positions in which they are shown in FIG. 1 and inoperative positions wherein they are folded against the flat sheet of fiberboard, as shown in FIGS. 3, 4 and 5. The ears 42 are fastened to the sheet 30 near the free edge thereof by means of rivets 45 which pass through the ears and sheet and also through the base portion 46 of a conventional spring clip assembly 48 having a spring-pressed clamping element 50 associated therewith and by means of which one or more sheets of paper or the like may be clamped to the front face of the fiberboard sheet 30.

The previously-mentioned separable hinged connection 21 between two parts 18 and 20 includes a pair of hinge clips 52 having flat base portions 54 which are riveted as at 56 to the sheet 30 near the proximate edge of the latter and which are reversed upon themselves as at 58 to provide spaced reentrant portions which overlie the base portions 54 and define, in combination therewith, hinge pockets adapted to receive therein the straight bight portion 60 of a U-shaped frame member 62 associated with the back part or assembly 18 and the nature of which will be made clear presently. The bight portion 60 is capable of being forced between the reentrant portions 58 and base portions 54 of the hinge clips 52 to assemble the two parts 18 and 20 upon each other and of being forcibly slid from its position of confinement within the clips 52 for separation of the two parts.

The back part or assembly 18 involves in its general organization a generally rectangular, three-sided articulated frame assembly 70, of which the previously-mentioned frame member 62 forms a part. The frame assembly 70 is of three-piece construction, and it includes, in addition to the frame member 62, a pair of rotatable side members 72 which, in effect, constitute elongated coaxial extensions of the side legs 74 of the U-shaped frame member 62. The rotatable side members 72 extend in parallelity along the side edges of the back part 18 and the distal ends thereof terminate in the previously-mentioned curved hook members 22. The inner ends of the side members 72 are swivelly connected to the outer ends of the side legs 74 by swivel connections 80, such as the one illustrated in FIG. 6.

Such swivel connection 80 is in the form of an open-ended tubular sleeve 82 which telescopically receives therein a limited end region of a side leg 74 and which is welded thereto as at 84. The other open end of the sleeve 82 telescopically receives therein a limited end region of the rotatable side member 72. This end region of the member 72 is formed with an annular groove 86 thereround, and the wall of the tube 82 is crimped inwardly as at 88 to lock the side member 72 against axial shifting relative to the sleeve, while at the same time, permitting relative rotation between the two parts.

The back part 18 further includes a composite frame covering consisting of three strips of cloth-backed plastic sheet material, the front side of which presents a smooth continuous waterproof surface. Various commercial sheet materials are available and are suitable for the purpose intended. One material which has been found particularly acceptable is the material known as "Dalphin," which is manufactured and sold by Reliable Textile Company of Chicago, Illinois.

The three sheets of material include a relatively large base or rear sheet 90 (FIG. 4) of substantially the full height of the frame assembly 70, a front sheet 92 of lesser height, and an intermediate sheet 93 of small vertical extent. The three sheets are of the same width and their side margins are folded around the frame side members 72, the swivel connections 80, and limited portions of the side legs 74 thus, in effect, forming tubular sleeve portions 94 through which these frame members extend. The three thicknesses of material are superimposed upon each other, and rows of stitching 96, common to the three thicknesses, secure them together and also secure the longitudinal edges of the tubular sleeve portions together.

A vertical row of stitching 98 and a horizontal row of stitching 100 divides the space existing between the two sheets 90 and 92 into two article-receiving pockets or compartments, while a row of stitching 102 establishes a pocket or compartment between the sheets 90 and 93.

In use within the driver's compartment of an automobile, the device may be positioned as shown in FIG. 1 with the hook members 22 extending over the upper edge of the back rest 14 of the seat assembly 10 and with the back member 18 disposed in an upright position. The back side of the back member 18 opposes and contacts the forwardly-facing surface of the back rest, while the front side of the back member faces forwardly to expose and render available for use the various article-receiving compartments. The base member assumes a substantially horizontal position, although it may have a slight incline, as shown in FIG. 2, so that the writing surface of the fiberboard member or sheet associated therewith will better meet the eye of the user, and also so that small objects, such as pens, pencils, erasers or the like, which may be placed upon the writing surface, will not be apt to slide forwardly during deceleration of the automotive vehicle. The forward or free edge region of the fiberboard sheet 30 is maintained elevated from the seat cushion 12 by means of the supporting legs 24.

The lower ends of the supporting legs 24, as well as the extreme ends of the hook portions 22, may be provided with rubber or other protective tips 104 to protect the automobile upholstery.

When the writing surface of the base part 20 is not in use, the entire base part may be folded against the upright back part 18 by swinging the base part bodily upwardly so that the writing surface fits flush against the front side of the front part 18, as shown in dotted lines in FIG. 2. The supporting legs 24 will then move downwardly under the influence of gravity and fold against the rear exposed side of the base part.

If desired, the back part 18 may be left in position on the back rest 14 and the base part removed by disengaging the straight bight portion 60 of the U-shaped frame member 62 from the hinge clips 52, as previously described. After such removal, the base part may be used as a lap board for writing purposes, or it may be disposed in an inclined position with one transverse edge resting on a supporting surface and with the other transverse edge being maintained elevated by the legs 24. Alternatively, the base part 20 may be left on the seat cushion 12 and the back part removed for use as a carrying case.

In either of the two folded conditions of which the automobile desk is capable of assuming, the contents of the various compartments will not be disturbed and the folded device will consume but little storage space. When the parts 18 and 20 are folded in back-to-back relationship, the collapsible legs 24 and the hook portions 22 may be enclosed between the two parts as shown in FIG. 4.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

Having thus described the invention what I claim as new and desire to secure by Letters Patent is:

1. In a two-part, portable automobile desk, in combination, a back part adapted to be supported in an upright position on the back rest of an automobile seat, and a base part adapted to be supported in an approximately horizontal position on the seat cushion of the seat, said back part comprising a generally rectangular U-shape frame formed of cylindrical rod stock and including a pair of spaced parallel side members and a straight connecting bight portion, the free ends of said side members being provided with reentrant hook portions adapted to extend over the upper edge of the back rest to support the frame in an upright position against the forwardly facing surface of the back rest, said base part comprising a flat generally rectangular sheet of rigid material having its inner edge region hingedly connected to said bight portion for swinging movement about the axis thereof, a pliable, flat flexible sheet of plastic material extending between and having its side edges secured to said parallel side members throughout substantially their entire length exclusive of the reentrant hook portions thereof, and an additional pliable flexible sheet of plastic material secured to said first-mentioned sheet of plastic material and defining, in combination therewith, an article-receiving pocket, and a supporting leg hingedly connected to the distal edge region of the rigid sheet for swinging movement between an inoperative collapsed position wherein it lies flush against the back side of the sheet and an operative extended position wherein it extends substantially normal to the sheet, the hinge connection between the sheet and bight portion of the back part being adapted to support the inner end of the sheet above the level of the seat cushion, and the leg, when extended, being adapted to rest upon the seat cushion and to support the outer end of the sheet above the level of the seat cushion when the back part is in operative position on the back rest, said front part being capable of swinging movement toward and away from the back part whereby the two parts may be folded against each other in substantially coplanar relationship.

2. In a two-part, portable automobile desk, in combination, a back part adapted to be supported in an upright position on the back rest in an automobile seat, and a base part adapted to be supported in an approximately horizontal position on the seat cushion of the seat, said back part comprising a generally rectangular U-shape frame assembly including a U-shape frame member formed from cylindrical rod stock and including parallel side legs and a straight interconnecting bight portion, a rotatable side leg extension coaxial with and extending outwardly from each side leg, and a swivel connection between each side leg and its respective extension, the outer end of each side leg extension being formed with a hook portion adapted to extend over the upper edge of the back rest to support the frame assembly in an upright position against the forwardly facing surface of the back rest, said base part comprising a flat generally rectangular sheet of rigid material having its inner edge region hingedly connected to said bight portion for swinging movement about the axis thereof, a supporting leg hingedly connected to the distal edge region of the rigid sheet for swinging movement between an inoperative collapsed position wherein its lies flush against the back side of the sheet and an operative extended position wherein it extends substantially normal to the sheet, the hinge connection between the sheet and bight portion of the back part being adapted to support the inner end of the sheet above the level of the seat cushion, and the leg, when extended, being adapted to rest upon the seat cushion and to support the outer end of the sheet above the level of the seat cushion when the back part is in operative position on the back rest, said front part being capable of swinging movement toward and away from the back part whereby the two parts may be folded against each other in substantially coplanar relationship a pliable flexible sheet of plastic material extending across the sides of said U-shape frame assembly and presenting at its marginal side edges elongated tubular sleeve portions through which the side legs of the frame assembly project and which serve to enclose and conceal portions of the side legs, portions of the side leg extensions, and said swivel connections.

References Cited in the file of this patent

UNITED STATES PATENTS

| | | |
|---|---|---|
| 1,223,272 | Gurley | Apr. 17, 1917 |
| 2,556,724 | Hubsch | June 12, 1951 |
| 2,601,177 | Smullen | June 17, 1952 |
| 2,741,521 | Bell et al. | Apr. 10, 1956 |
| 2,862,328 | Wadsworth | Dec. 2, 1958 |
| 2,889,051 | Kramer | June 2, 1959 |